United States Patent
Lo

(10) Patent No.: US 10,558,332 B2
(45) Date of Patent: Feb. 11, 2020

(54) COMPUTATIONALLY EFFICIENT HUMAN-COMPUTER INTERFACE FOR WEB BROWSER TAB USER INTERFACE BUTTON

(71) Applicant: Microsoft Technology Licensing, LLC, Redmond, WA (US)

(72) Inventor: Lauren Diana Lo, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/941,420

(22) Filed: Mar. 30, 2018

(65) Prior Publication Data

US 2019/0302973 A1 Oct. 3, 2019

(51) Int. Cl.
*G06F 3/048* (2013.01)
*G06F 3/0483* (2013.01)
*G06F 3/0482* (2013.01)

(52) U.S. Cl.
CPC .......... *G06F 3/0483* (2013.01); *G06F 3/0482* (2013.01)

(58) Field of Classification Search
CPC .............................. G06F 3/0483; G06F 3/0482
See application file for complete search history.

(56) References Cited

U.S. PATENT DOCUMENTS

| 7,673,233 | B2 | 3/2010 | Moore et al. |
| 8,386,955 | B1 | 2/2013 | Weber et al. |
| 8,683,374 | B2 | 3/2014 | Vaughan et al. |
| 8,910,070 | B2 | 12/2014 | Goodger et al. |
| 9,213,775 | B2 | 12/2015 | Tseng |
| 9,894,050 | B1* | 2/2018 | Wright .................. G06F 16/955 |
| 2009/0187824 | A1* | 7/2009 | Hinckley ................ G06F 9/453 |
| | | | 715/711 |
| 2009/0228804 | A1 | 9/2009 | Kim et al. |
| 2009/0319937 | A1* | 12/2009 | Molander ............... G06F 9/451 |
| | | | 715/777 |
| 2010/0070928 | A1* | 3/2010 | Goodger ............ G06F 16/9577 |
| | | | 715/838 |
| 2011/0307794 | A1 | 12/2011 | Hilerio et al. |

(Continued)

OTHER PUBLICATIONS

Barso, Foosy, "DblClickDial", Retrieved From <<https://sites.google.com/site/dblclickdial/>>, May 14, 2009, 2 Pages.

(Continued)

*Primary Examiner* — David E Choi
(74) *Attorney, Agent, or Firm* — Newport IP, PLLC; Tim R. Wyckoff

(57) ABSTRACT

A user interface (UI) button is implemented with enhanced web browser functionality. The UI button is a tab page button that may be selected to open a new tab page within a web browser. A user of a web browser may also select the UI button to display a drop-down menu that includes one or more links to recently visited webpages, favorite webpages, applications, and/or other UIs associated with a computing device. A pointer, such as a pointer controlled by a mouse coupled to the computing device, may be caused to hover over the UI button. Such a hover action may cause the web browser to display a drop-down menu that includes one or more links to recently visited webpages, favorite webpages, applications, and/or other UIs associated with the computing device.

18 Claims, 6 Drawing Sheets

(56) References Cited

U.S. PATENT DOCUMENTS

| | | |
|---|---|---|
| 2015/0169154 A1 | 6/2015 | Ainslie et al. |
| 2015/0212670 A1 | 7/2015 | Chang et al. |
| 2015/0213148 A1 | 7/2015 | Blemaster |
| 2016/0370974 A1* | 12/2016 | Stenneth ............. G06F 3/04842 |

OTHER PUBLICATIONS

Megan, "Open & use tabs", Retrieved From <<https://support.google.com/chrome/answer/2391819?co=GENIE.Platform%3DAndroid&hl=en>>, Retrieved on: Jul. 20, 2017, 4 Pages.

"International Search Report and Written Opinion Issued in PCT Application No. PCT/US2019/023768", dated May 9, 2019, 11 Pages.

* cited by examiner

COMPUTATIONALLY EFFICIENT HUMAN-COMPUTER INTERFACE FOR WEB BROWSER TAB USER INTERFACE BUTTON

BACKGROUND

A web browser is a software application that is commonly used for retrieving, presenting and traversing information resources on the World Wide Web. Each information resource is identified by a Uniform Resource Locator (URL) and may be a webpage, an image, a video, or other piece of content. Hyperlinks present in information resources enable users to easily navigate their web browsers to related information resources. Examples of modern web browsers include but are not limited to Microsoft Edge and Internet Explorer, published by Microsoft Corporation of Redmond, Wash., Chrome, published by Google Inc. of Mountain View, Calif., Firefox, published by the Mozilla Foundation of Mountain View, Calif., and Safari, published by Apple Inc. of Cupertino, Calif.

Web browsers typically obtain information based on input that is provided by a user at the time the information is being sought. For example, a user can direct a web browser to a particular information resource by typing the URL of the resource into an address bar of the web browser's user interface (UI). As another example, a user may access an Internet search engine via a web browser, and then obtain information by typing a search query into the search engine's UI that is presented within the context of the web browser. In either case, it may be difficult for the user to find useful information because the user must either know the URL of an information resource that provides useful information or the precise set of key words that will cause the search engine to identify information resources that include useful information.

Some web browsers enable a user to maintain a list of favorite or bookmarked webpages to provide easy access thereto. However, the process of accessing such a list of favorite or bookmarked webpages requires a series of user-initiated input device (e.g., mouse or touch) selections that consume time. Furthermore, conventional web browsers do not provide a simple, quick and elegant solution for selecting favorite webpages, recently visited webpages, and/or applications/UIs associated with a computing device. The multiple user-initiated input device selections and/or the lack of an elegant solution for selecting favorite webpages, recently visited webpages, and/or applications/UIs associated with the computing device utilize unnecessary processor cycles, memory, battery life and so forth.

SUMMARY

The disclosed techniques enable a user of a computing device to quickly and efficiently view and select recently visited webpages, favorite webpages, applications, and/or other user interfaces (UI) associated with the computing device. Therefore, at least some of the disclosed techniques that allow users to quickly and efficiently view and select recently visited webpages, favorite webpages, applications, and/or other UIs reduce unnecessary power cycles, memory use, extend battery life and so forth.

A web browser may have a UI button that enables a user to open a tab page associated with the web browser. The UI button is implemented with enhanced web browser functionality. In some implementations, the UI button is a tab page button that may be selected to open a new tab page within a web browser. A user of the web browser may also select the UI button to display a drop-down UI that includes one or more links to recently visited webpages, favorite webpages, applications, and/or other UIs associated with the computing device.

In some implementations, a pointer, such as a pointer controlled by a mouse coupled to the computing device, may be caused to hover over the UI button. Such a hover action may cause the web browser to display a drop-down UI that includes one or more links to recently visited webpages, favorite webpages, applications, and/or other UIs associated with the computing device. Optionally, the pointer may be caused to move over the UI button.

Subsequently, a control on an input device, such as a mouse, may be actuated to cause the web browser to display the drop-down UI that includes links to one or more recently visited webpages, favorite webpages, applications, and/or other UIs associated with the computing device. The control on the input device may be one of a plurality of buttons associated with the input device. The control may be actuated by a user of the input device.

In some implementations, the user of the web browser may select the UI button to display a window or page that includes links to one or more recently visited webpages, favorite webpages, applications, and/or other UIs associated with the computing device. In some implementations, a pointer, such as a pointer controlled by a mouse coupled to the computing device, may be caused to hover over the UI button. Such a hover action may cause the web browser to display a window or page that includes links to one or more recently visited webpages, favorite webpages, applications, and/or other UIs associated with the computing device. Optionally, the pointer may be caused to move over the UI button.

Subsequently, a control on an input device, such as a mouse, may be actuated to cause the web browser to display the window or page that includes links to one or more recently visited webpages, favorite webpages, applications, and/or other UIs associated with the computing device. The control on the input device may be one of a plurality of buttons associated with the input device. Therefore, through the use of the UI button according to at least some disclosed implementations, users can quickly and efficiently view and select recently visited webpages, favorite webpages, applications, and/or other UIs thus reducing unnecessary power cycles, memory use, extend battery life and so forth.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWING

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
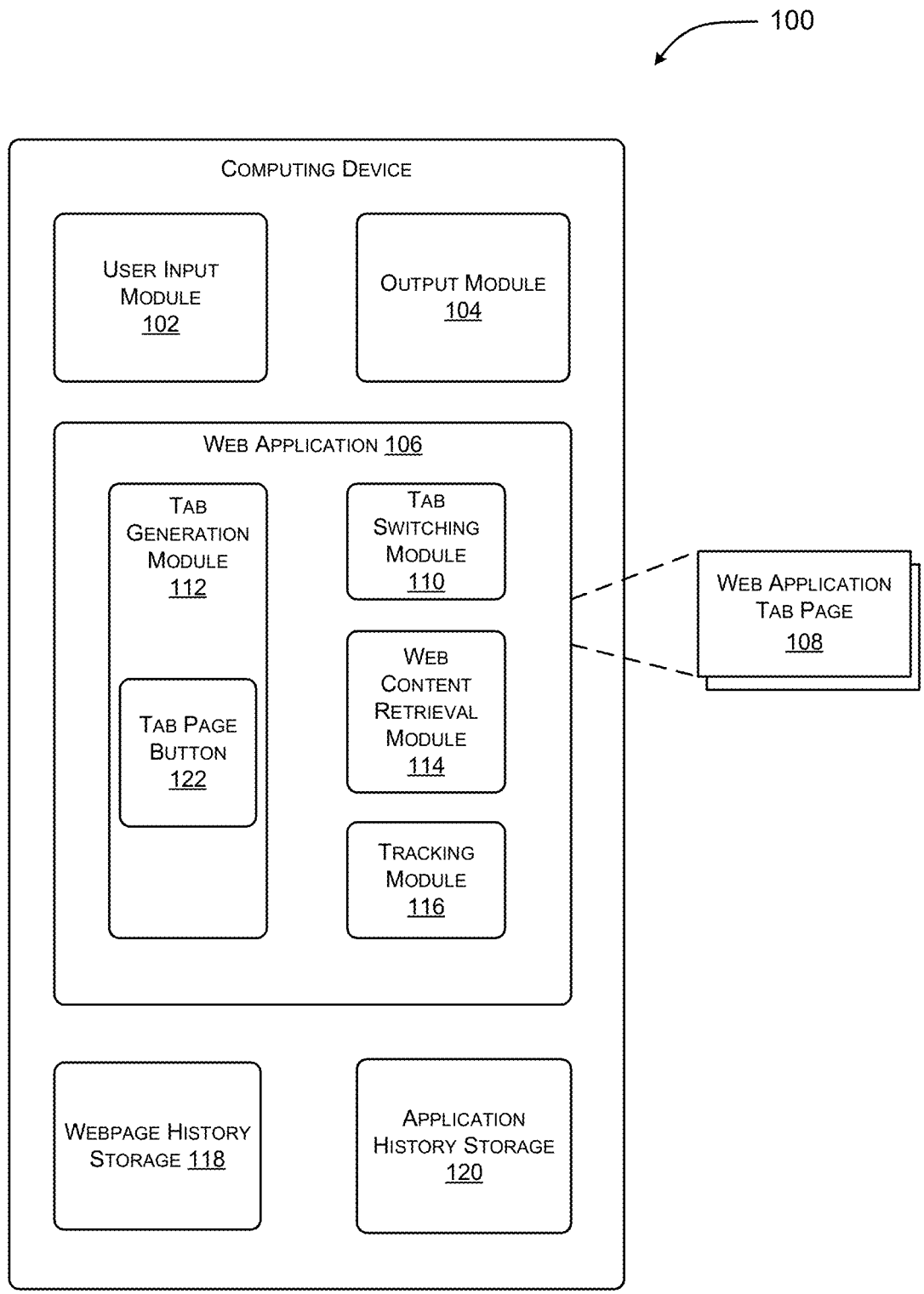
FIG. 1 is a block diagram illustrating an example computing device that may implement or use a web browser that includes an enhanced web browser tab page button.

The disclosed techniques enable a user of a computing device to quickly and efficiently view and select recently visited webpages, favorite webpages, applications, and/or other user interfaces (UI) associated with the computing device. A web browser may be associated with the computing device. The web browser may have a UI button. In some implementations, the UI button enables a user to open a tab page associated with the web browser. Therefore, at least some of the disclosed techniques that allow users to quickly and efficiently view and select recently visited webpages, favorite webpages, applications, and/or other UIs reduce unnecessary power cycles, memory use, extend battery life and so forth.

According to some implementations described herein, the UI button is implemented with enhanced web browser functionality. In some implementations, the UI button is a tab page button that may be selected to open a new tab page within a web browser. A user of the web browser may select the UI button to display a drop-down menu that includes one or more links to recently visited webpages, favorite webpages, applications, and/or other UIs associated with the computing device.

In some implementations, a pointer, such as a pointer controlled by a mouse coupled to the computing device, may be caused to hover over the UI button. Such a hover action may cause the web browser to display a drop-down menu that includes one or more links to recently visited webpages, favorite webpages, applications, and/or other UIs associated with the computing device. Optionally, the pointer may be caused to move over the UI button.

Subsequently, a control on an input device, such as a mouse, may be actuated to cause the web browser to display the drop-down menu that includes links to one or more recently visited webpages, favorite webpages, applications, and/or other UIs associated with the computing device. The control on the input device may be one of a plurality of buttons associated with the input device.

In some implementations, the user of the web browser may select the UI button to display a window or page that includes links to one or more recently visited webpages, favorite webpages, applications, and/or other UIs associated with the computing device. In some implementations, a pointer, such as a pointer controlled by a mouse coupled to the computing device, may be caused to hover over the UI button. Such a hover action may cause the web browser to display a window or page that includes links to one or more recently visited webpages, favorite webpages, applications, and/or other UIs associated with the computing device.

Optionally, the pointer may be caused to move over the UI button. Subsequently, a control on an input device, such as a mouse, may be actuated to cause the web browser to display the window or page that includes links to one or more recently visited webpages, favorite webpages, applications, and/or other UIs associated with the computing device. The control on the input device may be one of a plurality of buttons associated with the input device. Various examples, implementations, scenarios, and aspects are described below with reference to FIGS. 1 through 6.

FIG. 1 is a block diagram illustrating an example computing device 100 that may implement or use a web browser that includes an enhanced web browser tab page button. The computing device 100 can be a variety of different types of devices, such as a physical device or a virtual device. For example, the computing device 100 can be a physical device such as a desktop computer, a server computer, a laptop or netbook computer, a tablet or notepad computer, a mobile device or station, an entertainment appliance, a set-top box communicatively coupled to a display device, a television or other display device, a cellular or other wireless phone, a game console, an automotive computer, and so forth.

The computing device 100 can also be a virtual device, such as a virtual machine running on a physical device. A virtual machine can be run on any of a variety of different types of physical devices (e.g., any of the various types listed above). Thus, the computing device 100 may range from full resource devices with substantial memory and processor resources (e.g., personal computers, game consoles) to low-resource devices with limited memory and/or processing resources (e.g., traditional set-top boxes, handheld game consoles).

The computing device 100 includes a user input module 102, an output module 104, and a web application 106, also referred to herein as a web browser. The user input module 102 receives user inputs from a user of the computing device 100. User inputs can be provided in a variety of different manners, such as by pressing one or more keys, also referred to herein as controls, of a keypad or keyboard of the device 100, pressing one or more keys of a controller (e.g., remote control device, mouse, track pad, etc.) of the device 100, pressing a particular portion of a touchpad or touchscreen of the device 100, making a particular gesture on a touchpad or touchscreen of the device 100, and/or making a particular gesture on a controller (e.g., remote control device, mouse, track pad, etc.) of the device 100.

User inputs can also be provided via other physical feedback input to the device 100, such as tapping any portion of the device 100, an action that can be recognized by a motion detection or other component of the device 100 (such as shaking the device 100, rotating the device 100, bending or flexing the device 100, etc.), and so forth. User inputs can also be provided in other manners, such as via voice or other audible inputs to a microphone, via motions of hands or other body parts observed by an image capture device, and so forth.

The output module 104 generates, manages, and/or outputs content for display, playback, and/or other presentation. This content can be created by the output module 104 or obtained from other modules of the computing device 100 (e.g., by the web application 106). This content can be, for example, a display or playback portion of a UI. The content can be displayed or otherwise played back by components of the computing device 100 (e.g., speakers, interactive display devices, etc.). Alternatively, the output module 104 can generate one or more signals that are output to other devices or components (e.g., speakers, display devices, etc.) that are separate from the computing device 100.

The web application 106 is an application that displays or otherwise presents web content. The web application 106 can be implemented as a separate application run by an operating system of the computing device 100, or alternatively as at least part of the operating system of the computing device 100. Web content refers to various types of electronic content that can be displayed or otherwise presented by the computing device 100. The Web content is typically written in a markup language, such as eXtensible Markup Language (XML) or HyperText Markup Language (HTML). The Web content can also include content written in other languages, such as JavaScript, Cascading Style Sheets (CSS), and so forth. In one or more embodiments, the web content is a web page.

In one or more implementations, the web content is one or more web pages, and the web application 106 is a web browser that obtains the web pages from various web sites via a network such as the Internet, a local area network (LAN), a public telephone network, an intranet, other public and/or proprietary networks, combinations thereof, and so forth. Alternatively, the web application 106 can be other types of applications that obtain web pages or other web content from web sites or other sources, such as audio/video playback applications, electronic book or magazine readers, and so forth.

In one or more implementations, the web application 106 supports web application tab pages, also referred herein to as UI tabs. A web application tab page 108 refers to the UI area where web content is displayed by the web application 106. Although web content is discussed herein as being displayed, it should be noted that web content can additionally or alternatively be presented in other manners, such as being played back audibly. The web application 106 can have multiple web application tab pages 108, each of which can be a particular instance of the web application 106.

In one or more implementations, a single web application tab page 108 is displayed by the web application 106 at a time. Alternatively, multiple web application tab pages 108 can be displayed by the web application 106 at a time. Each web application tab page 108 can have its own separate set of associated web application tabs.

One or more of the web application tab pages 108 can be different types of tab pages, including a visible tab page, a hidden tab page, and an empty tap page. A visible tap page refers to a web application tab hosting web content that is currently visible or would be visible if the web application 106 were active (e.g., the web content that would be displayed if the web application 106 were not minimized or covered by another window). A hidden tab page refers to web application tab page hosting web content that is not currently visible (e.g., hidden or minimized).

In one or more implementations, the web content hosted in a hidden tab page is suspended. An empty tab page refers to a web application tab page that that hosts no web content or alternatively very simple or primitive web content (e.g., web content that results in no display or less than a threshold amount of data being displayed, such as a blank web page (a web page that includes no HTML) or a web page that displays the words "empty page"). An empty tab page may include links to favorite websites, previously viewed websites, recently viewed websites, and/or previously used computer applications (e.g., word processor applications or spreadsheet applications).

The web application 106 includes multiple modules that facilitate usage of the multiple web application tab pages 108 and the retrieval of web content that may be associated with the web application tab pages 108. Although these modules are illustrated as being part of the web application 106, it should be noted that one or more of the modules can be implemented by other applications or programs (e.g., by an operating system of the computing device 100). These modules include a tab switching module 110, a tab generation module 112, and a web content retrieval module 114. The web application 106 may also include a tracking module 116.

One or more of the modules associated with the web application 106 may be otherwise implemented by other applications or modules associated with the computing device 100. Specifically, the modules associated with the web application 106 need not necessarily be implemented by the web application 106.

The tab switching module 110 manages the web application tab pages 108, including switching which tab page(s) is visible, which tab page(s) are hidden, and which tab page(s) are empty. The tab generation module 112 creates new web application tab pages 108. The web content retrieval module 114 retrieves or otherwise obtains web content to be hosted by one or more of the web application tab pages 108.

The tab generation module 130 may include a tab page button 122. The tab page button 122 may also be referred to herein as a selectable UI component. The tab page button 122 may be selectable to cause the display of one or more web application tab pages 108. For example, in one implementation, the tab page button 122 may be selected by using a control (e.g., keyboard key, mouse button, audible command, resistive touch, and/or capacitive touch) associated with an input device coupled to the computing device 100 and/or the user input module 102.

The tab page button 122 may be configured to be selected in a plurality of different ways. For example, in some implementations, the tab page button 122 may be configured to be actuated using a predetermined first control or selection type (e.g., keyboard key, mouse button, audible command, resistive touch, and/or capacitive touch) to cause the display in the web application 106 of a new web application tab page 108. Furthermore, in some implementations, the tab page button 122 may be configured to be actuated using a predetermined second control or selection type (e.g., keyboard key, mouse button, cursor hover, audible command, resistive touch, and/or capacitive touch) to cause the display in the web application 106 and/or an operating system of the computing device 100 of a UI including at least one selectable link associated with a previously accessed webpage and/or at least one selectable link associated with a previously accessed computer application.

The at least one selectable link associated with the previously accessed webpage and/or the at least one selectable link associated with the previously accessed computer application may be selected to cause the relevant webpage and/or application to be displayed by a web application tab page 108, the web application 106, the computing device 100, or the like. In some implementations, as will be described herein, the UI is a drop-down UI that may be associated with the tab page button 122 or a UI window.

In some implementations, the UI may include selectable links to a predetermined number of recently accessed webpages, suggested webpages and/or favorite webpages and/or a predetermined number of recently accessed computer applications, suggested computer applications and/or favorite computer applications. The at least one selectable link associated with the UI may be retrieved by the tab generation module 130 from a webpage history storage 118 and/or an application history storage 120. The suggested webpages and/or suggested computer applications may be suggested by the computing device 100, web application 106, and the like. For example, artificial intelligence associated with the computing device 100, web application 106, and the like may provide the suggested webpages and/or suggested computer applications based on previously browsed webpages and/or previously used computer applications. However, other context associated with the computing device 100 and/or external sources may provide the artificial intelligence associated with the computing device 100, webpage application 106, and the like with information or data usable in determining and providing the suggested webpages and/or suggested computer applications.

The tracking module 116 may track the web content that is retrieved by the web content retrieval module 114 and displayed or rendered by the web application 106 and/or one or more of the web application tab pages 108. Furthermore, the tracking module 106 may track computer applications that have been executed by the computing device 100.

As described in the foregoing, the webpage history storage 118 and the application history storage 120 may be implemented by the computing device 100. The webpage history storage 118 may store links (e.g., selectable Uniform Resource Locators (URLs)) associated with recently accessed webpages, favorite webpages, previously accessed webpages, and the like. The webpage history storage 118 may be configured to store a predetermined number of the recently accessed webpages, favorite webpages, previously accessed webpages, and the like.

The tracking module 116 may cause links associated with web content that are retrieved by the web content retrieval module 114 and displayed are rendered by the web application 106 and/or one or more of the web application tab pages 118 to be stored in the webpage history storage 118. The application history storage 120 may store one or more file path locations associated with previously accessed and/or recently accessed computer applications.

The tracking module 116 may cause the storage of the one or more file path locations also referred to as links, associated with previously accessed and/or recently accessed computer applications. The storages 118 and 120 may be associated with persistent or non-persistent computer implemented storage of the computing device 100 and/or one or more other computing devices.

Figure 2:
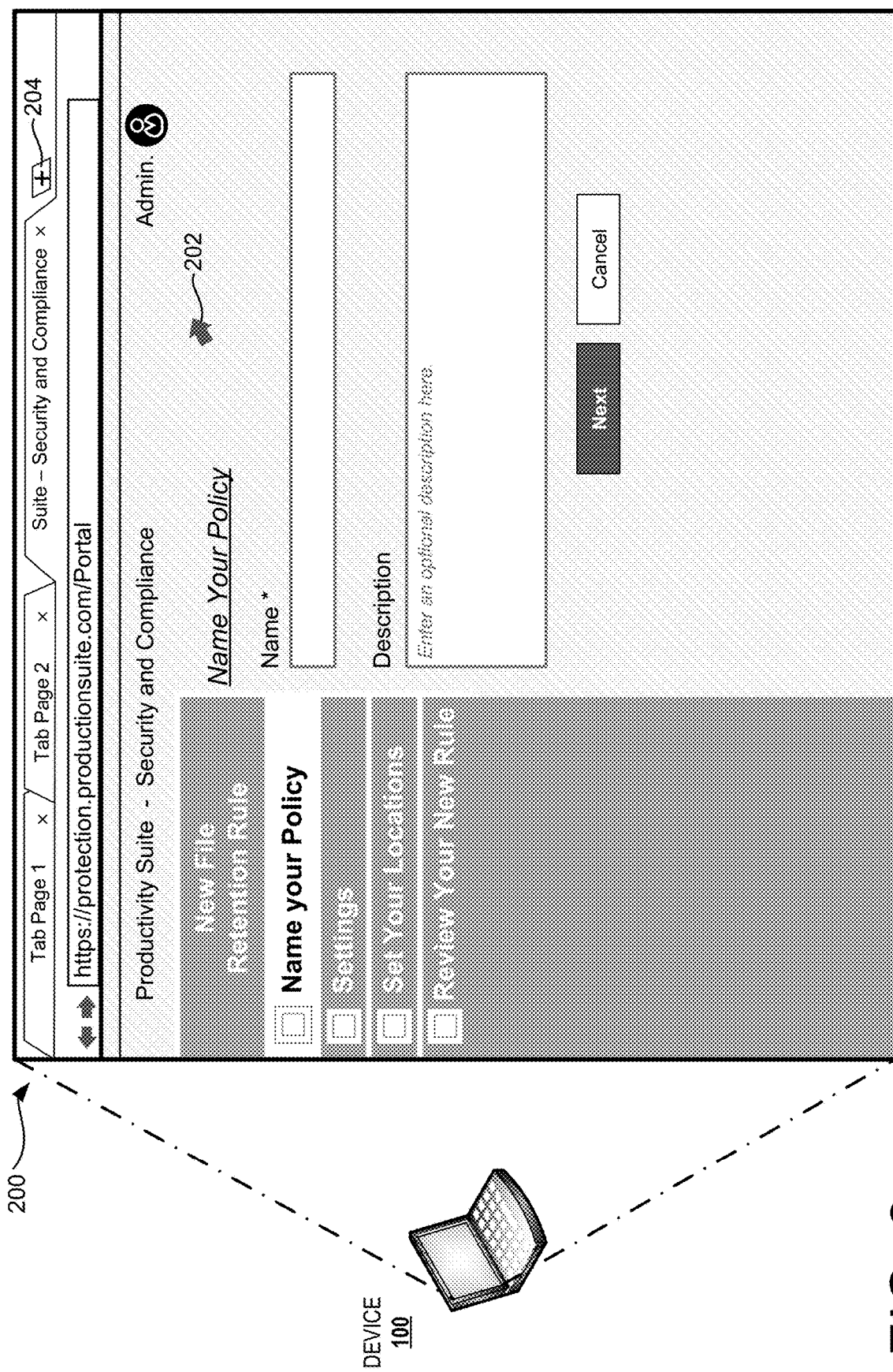
FIG. 2 illustrates an exemplary view of a web application provided by a computing device.

FIG. 2 illustrates an exemplary view of a web application 200 provided by the computing device 100. In some implementations, the web application 200 is a web browser displayed by the output module 104 of the computing device 100. As illustrated, the web application 200 may comprise a plurality of UI tabs or tab pages (e.g., tab page 1, tab page 2 and an active tab page "suite-security compliance"). The tab pages tab page 1 and tab page 2 are hidden from view, while the tab page "site-security compliance" is visible or active.

The computing device 100 may also provide a controllable or movable UI pointer 202. The UI pointer 202 may be manipulated by an input device (e.g., mouse, capacitive touch, resistive touch, etc.) associated with the computing device 100 in order to select or activate one or more tab pages, links associated with web content, and the like.

The web application 200 may also include a selectable UI component 204, also referred to herein as a tab page button or a new tab page button. The selectable UI component 204 may be selected in a first predetermined manner or selection type to display a new tab page. The new tab page may be empty. Alternatively, the new tab page may include selectable links, graphically represented pictorially or by text, for previously accessed web content, webpages, applications, and/or recently accessed web content, webpages, applications, and/or favorite web content, webpages, applications, and the like. Furthermore, as will be described hereinafter, the selectable UI component 204 may be selected in a second predetermined matter or selection type to cause display of a UI that includes at least one selectable link associated with a previously accessed webpage and/or at least one selectable link associated with a previously accessed computer application.

The UI may be a drop-down UI associated with the selectable UI component 204. Alternatively, the UI may be a UI window that includes the at least one selectable link associated with the previously accessed webpage and/or the at least one selectable link associated with the previously accessed computer application.

Figure 3:
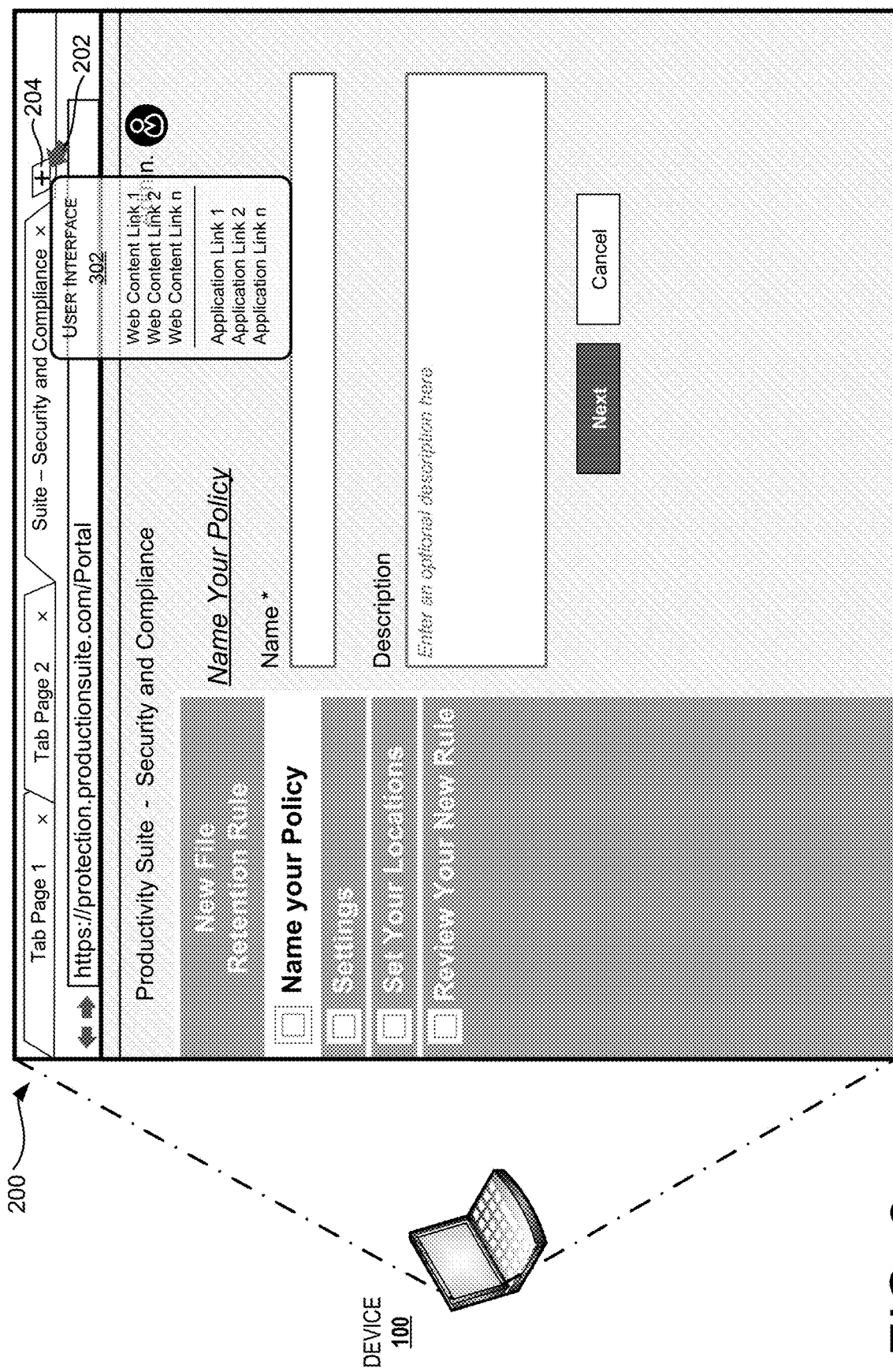
FIG. 3 illustrates another exemplary view of a web application provided by a computing device. This view of the web application illustrates a drop-down UI that is displayed when a new tab page button is selected in a predetermined manner or selection type.

FIG. 3 illustrates an exemplary view of the web application 200 provided by the computing device 100. This view of the web application 200 illustrates a UI 302 that is displayed when the selectable UI component 204 is selected in the second predetermined manner or selection type.

The second predetermined manner or selection type may be when the UI pointer 202 is caused to hover at least partially over the selectable UI component 204. An input associated with the computing device 100 may cause movement of the UI pointer 202 so that the UI pointer 202 is at least partially over the selectable UI component 204 for a predetermined duration of time (e.g., 1 second). Alternatively, the second predetermined manner or selection type may be when the UI pointer 202 is moved at least partially over the selectable UI component 204 coupled with an actuation of a control associated with an input device of the computing device 100. For example, the control may be a mouse button click, capacitive touch, resistive touch, audible command, and the like.

The UI 302 may include one or more selectable links. The one or more selectable links may be in text format (as shown) and/or the one or more selectable links may be in another visual representation (e.g., icon, thumbnail representation, etc.). As illustrated, the UI 302 includes a plurality of web content selectable links. One or more of the plurality of web content selectable links may be selected to open relevant web content, such as a website, in a new tab page.

Furthermore, in some implementations, the UI 302 includes a plurality of computer application links. One or more of the plurality of computer application links may be selected to launch or execute an associated computer application, such as a word processor application, spreadsheet application, or the like. The UI pointer 202 may be controlled, for example by a user of the computing device 100, to select a link provided in the UI 302.

In some implementations, the web content links and the computer application links are visually separated from one another. For example, as illustrated, a line or other delimiting feature may be rendered as part of the UI 302 to visually separate unique link types (e.g., separate web content links from computer application links).

In some implementations, the one or more web content links listed in the UI 302 are links to previously accessed webpages, recently accessed webpages, and/or favorite webpages. Furthermore, in some implementations, the one or more computer application links listed in the UI 302 are links to previously accessed computer applications, recently accessed computer applications, and/or favorite applications.

The links to previously accessed webpages, recently accessed webpages, and/or favorite webpages may be retrieved from the webpage history storage 118 by the computing device 100. Similarly, the links to previously accessed computer applications, recently accessed computer applications, and/or favorite applications may be retrieved from the application history storage 120 by the computing device 100.

Figure 4:
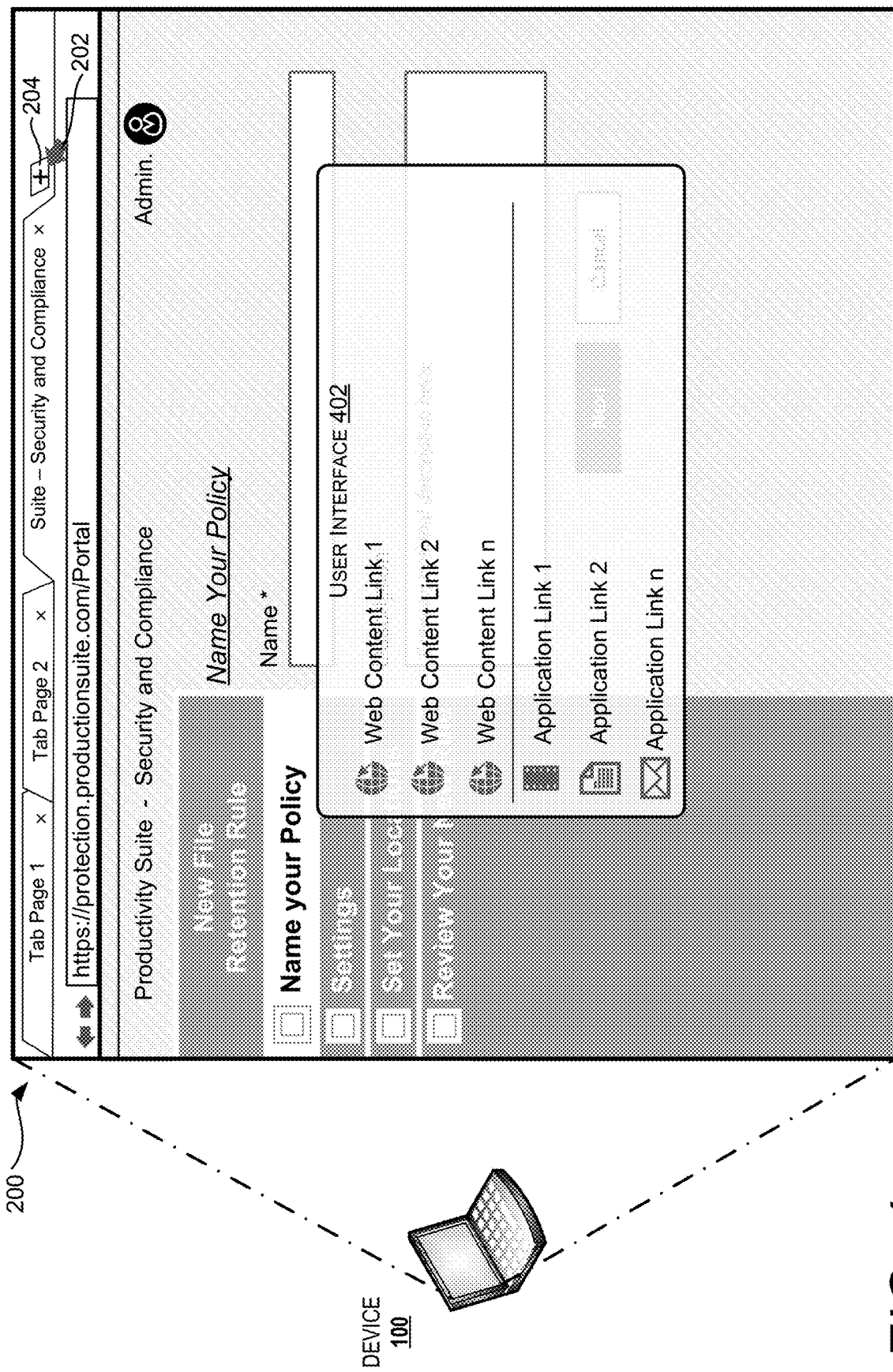
FIG. 4 illustrates another exemplary view of a web application provided by a computing device. This view of the web application illustrates a UI window that is displayed when a new tab page button is selected in a predetermined manner or selection type.

FIG. 4 illustrates an exemplary view of the web application 200 provided by the computing device 100. This view of the web application 200 illustrates a UI 402, shown as a separate UI window, that is displayed when the selectable UI component 204 is selected in the second predetermined manner or selection type.

The second predetermined manner or selection type may be when the UI pointer 202 is caused to hover at least partially over the selectable UI component 204. An input associated with the computing device 100 may cause movement of the UI pointer 202 so that the UI pointer 202 is at least partially over the selectable UI component 204 for a predetermined duration of time (e.g., 1 second). Alternatively, the second predetermined manner or selection type may be when the UI pointer 202 is moved at least partially over the selectable UI component 204 coupled with an actuation of a control associated with an input device of the computing device 100. For example, the control may be a mouse button click, capacitive touch, resistive touch, audible command, and the like.

The UI 402 may include one or more selectable links. The one or more selectable links may be in text format (as shown) and/or the one or more selectable links may be in another visual representation (e.g., icon, thumbnail representation, etc.). As illustrated, the UI 402 includes a plurality of web content selectable links. One or more of the plurality of web content selectable links may be selected to open relevant web content, such as a website, in a new tab page. Furthermore, in some implementations, the UI 402 includes a plurality of computer application links.

One or more of the plurality of computer application links may be selected to launch or execute an associated computer application, such as a word processor application, spreadsheet application, or the like. The UI pointer 202 may be controlled, for example by a user of the computing device 100, to select a link provided in the UI 402.

In some implementations, the web content links and the computer application links are visually separated from one another. For example, as illustrated, a line or other delimiting feature may be rendered as part of the UI 402 to visually separate unique link types (e.g., separate web content links from computer application links).

In some implementations, the one or more web content links listed in the UI 402 are links to previously accessed webpages, recently accessed webpages, and/or favorite webpages. Furthermore, in some implementations, the one or more computer application links listed in the UI 402 are links to previously accessed computer applications, recently accessed computer applications, and/or favorite applications.

The links to previously accessed webpages, recently accessed webpages, and/or favorite webpages may be retrieved from the webpage history storage 118 by the computing device 100. Similarly, the links to previously accessed computer applications, recently accessed computer applications, and/or favorite applications may be retrieved from the application history storage 120 by the computing device 100.

Figure 5:
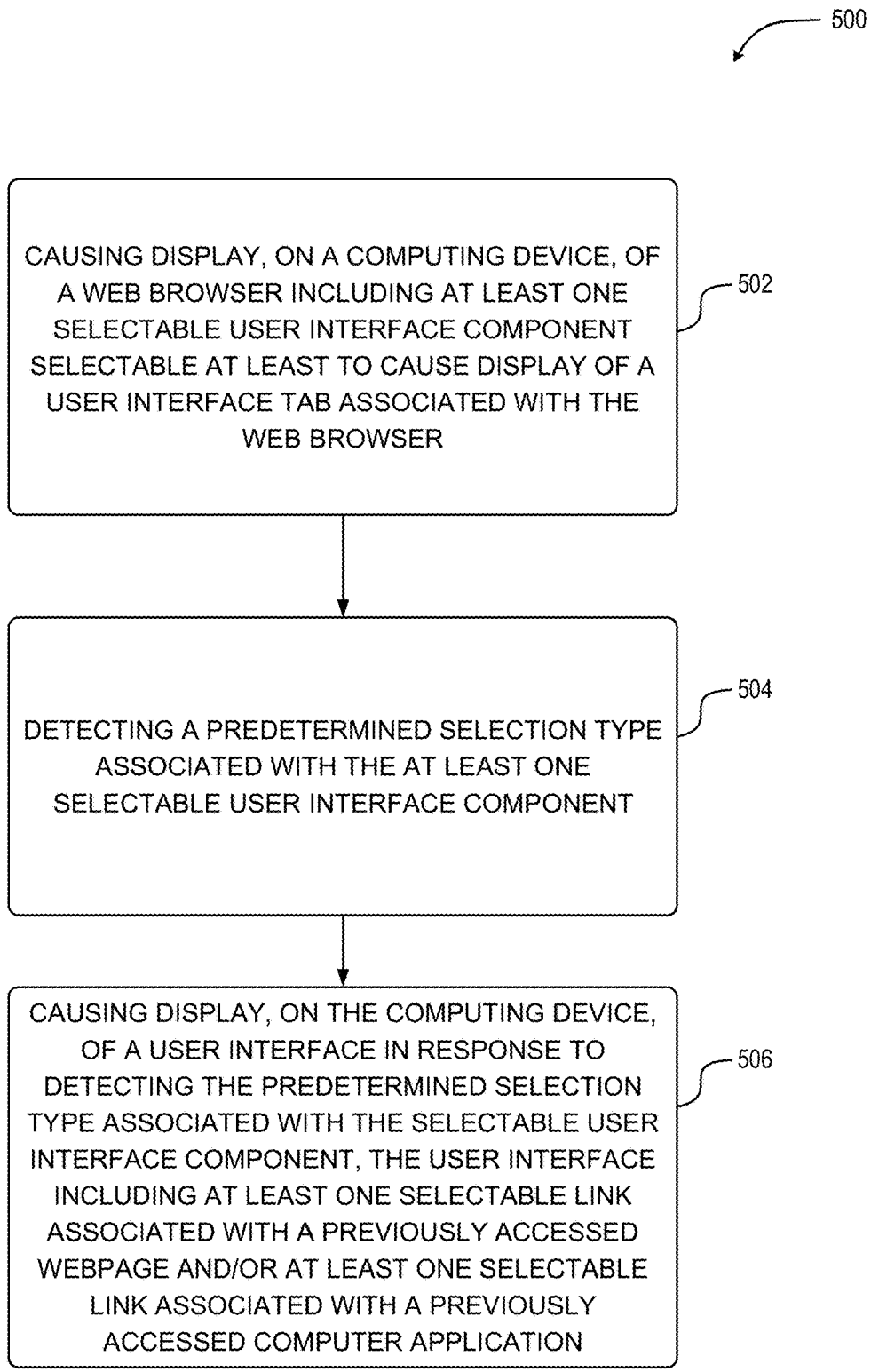
FIG. 5 is a diagram of an example flowchart that illustrates operations associated enabling implementation of a feature rich web browser tab user interface button.

FIG. 5 illustrates an example flowchart. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system (e.g., the computing device 100, or a plurality of computing devices) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Furthermore, the logical operations described herein may be implemented by a single computing device, such as a client device or a server device. Alternatively, the logical operations described herein may be implemented by a combination of server devices and client devices.

FIG. 5 is a diagram of an example flowchart 500 that illustrates operations associated with enabling implementation of a feature rich web browser tab user interface button. In one example, the operations of FIG. 5 can be performed by components of one or more computing devices 100, such as server and or/client computing devices. Specifically, in some implementations, server-side components, such as the device(s) 100 enable the feature rich web browser tab user interface button. Similarly, in some implementations, client-side components, such as one or more computing devices 100, enable the feature rich web browser tab user interface button. Therefore, the instructions associated with the example flowchart 500 may be executed by one or more processors associated with server-side components and/or client-side components.

At operation 502, one or more computing devices 100 may cause display of a web browser including at least one selectable user interface component selectable at least to cause display of a user interface tab associated with the web browser. For example, the one or more computing devices 100 may display the web application 106 via an output module 104. The web application 106 may include a tab page button 122. The tab page button 122 may be selected to cause display of the web application tab page 108. The web application tab page 108 may be associated with the web application 106. The web application 106 may be a web browser.

At operation 504, the one or more computing devices 100 may detect a predetermined selection type associated with the at least one selectable user interface component. For example, the one or more computing devices 100 may detect that a movable pointer is caused to hover over the tab page button 102. Causing the movable pointer to hover over the tab page button 102 is the predetermined selection type detected by the one or more computing devices 100.

At operation 506, the one or more computing devices 100 may cause display of a user interface in response to detecting the predetermined selection type associated with the selectable user interface component, the user interface including at least one selectable link associated with a previously accessed webpage and/or at least one selectable link associated with a previously accessed computer application. For example, the one or more computing devices 100 may display the user interface 302 or the user interface 402 in response to detecting that the movable pointer is caused to hover over the tab page button 102 for at least a predetermined time duration. The user interface 302 or the user interface 402 may include the at least one selectable link associated with the previously accessed webpage and/or the at least one selectable link associated with the previously accessed computer application.

Figure 6:
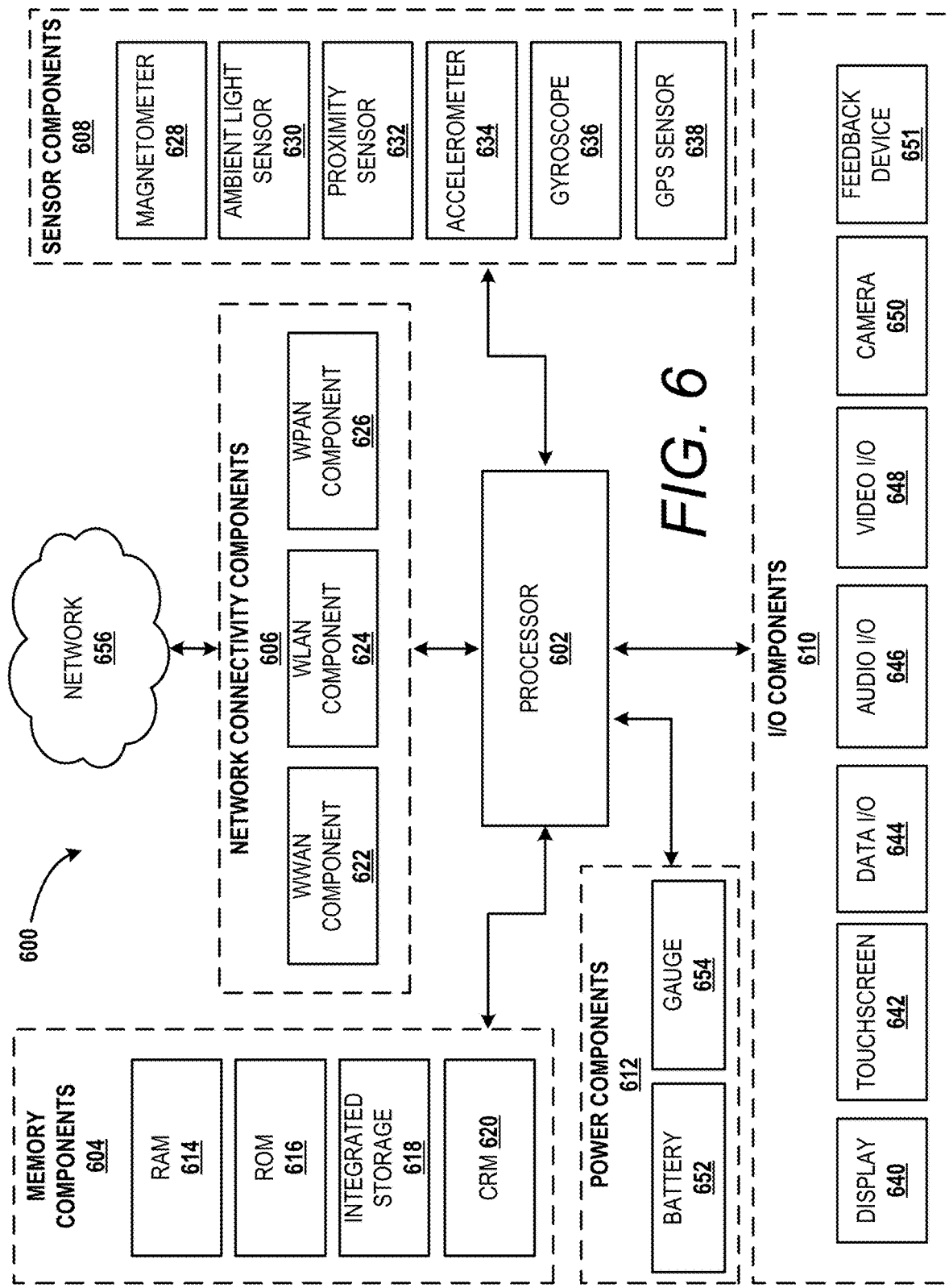
FIG. 6 illustrates a computer architecture diagram illustrating an illustrative hardware and software architecture for a computing system capable of implementing aspects of the techniques and technologies presented herein.

Turning now to FIG. 6, an illustrative computing device architecture 600 for a digital inking device and other computing devices that are capable of executing various software components is described herein. The computing device architecture 600 is applicable to computing devices that facilitate mobile computing due, in part, to form factor, wireless connectivity, and/or battery-powered operation. In some configurations, the computing devices include, but are not limited to, digital pens, digital inking devices, mobile telephones, tablet devices, slate devices, portable video game devices, and the like. The computing device architecture 600 is applicable to any of the computing devices shown in the accompanying figures. Moreover, aspects of the computing device architecture 600 may be applicable to traditional desktop computers, portable computers, e.g., phones, laptops, notebooks, ultra-portables, and netbooks, server computers, and other computer systems, such as described herein. For example, the single touch and multi-touch aspects disclosed herein below may be applied to desktop computers that utilize a touchscreen or some other touch-enabled device, such as a touch-enabled track pad or touch-enabled mouse. In some implementations, some or all of the computer device architecture 600 is implemented by the computing device 100.

The computing device 600 illustrated in FIG. 6 includes a processor 602, memory components 604, network connectivity components 606, sensor components 608, input/output components 610, and power components 612. In the illustrated configuration, the processor 602 is in communication with the memory components 604, the network connectivity components 606, the sensor components 608, the input/output ("I/O") components 610, and the power components 612. Although no connections are shown between the individual components illustrated in FIG. 6, the components can interact to carry out device functions. In some configurations, the components are arranged so as to communicate via one or more busses (not shown).

The processor 602 includes a central processing unit ("CPU") configured to process data, execute computer-executable instructions of one or more application programs, and communicate with other components of the computing device architecture 600 in order to perform various functionality described herein. The processor 602 may be utilized to execute aspects of the software components presented herein and, particularly, those that utilize, at least in part, a touch-enabled input.

In some configurations, the processor 602 includes a graphics processing unit ("GPU") (not shown) configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 602 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 602 is, or is included in, a system-on-chip ("SoC") (not shown) along with one or more of the other components described herein below. For example, the SoC may include the processor 602, a GPU, one or more of the network connectivity components 606, and one or more of the sensor components 608. In some configurations, the processor 602 is fabricated in part utilizing a package-on-package ("PoP") integrated circuit packaging technique. The processor 602 may be a single core or multi-core processor.

The processor 602 may be created in accordance with an ARM architecture, available for license from ARM HOLDINGS of Cambridge, United Kingdom. Alternatively, the processor 602 may be created in accordance with an x86 architecture, such as is available from INTEL CORPORATION of Mountain View, Calif. and others. In some configurations, the processor 602 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 604 include a random access memory ("RAM") 614, a read-only memory ("ROM") 616, an integrated storage memory ("integrated storage") 618, and a computer readable medium ("CRM") 620. In some configurations, the RAM 614 or a portion thereof, the ROM 616 or a portion thereof, and/or some combination of the RAM 614 and the ROM 616 is integrated in the processor 602. In some configurations, the ROM 616 is configured to store a firmware, an operating system or a portion thereof (e.g., operating system kernel), and/or a bootloader to load an operating system kernel from the integrated storage 618 and/or the CRM 620.

The integrated storage 618 can include a solid-state memory, a hard disk, or a combination of solid-state memory and a hard disk. The integrated storage 618 may be soldered or otherwise connected to a logic board upon which the processor 602 and other components described herein also may be connected. As such, the integrated storage 618 is integrated in the computing device. The integrated storage 618 is configured to store an operating system or portions thereof, application programs, data, and other software components described herein.

The computer-readable media (CRM) 620 can include a solid-state memory, a hard disk, or a combination of solid-state memory and a hard disk. In some configurations, the CRM 620 is provided in lieu of the integrated storage 618. In other configurations, the CRM 620 is provided as additional optional storage. In some configurations, the CRM 620 is logically combined with the integrated storage 618 such that the total available storage is made available as a total combined storage capacity. In some configurations, the total combined capacity of the integrated storage 618 and the CRM 620 is shown to a user instead of separate storage capacities for the integrated storage 618 and the removable storage 620.

As used herein, computer-readable media can store instructions executable by the processing unit(s) 602. Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. The claimed subject matter may be embodied in other ways, may include different elements or operations, and may be used in conjunction with other existing or future technologies. This description should not be interpreted as implying any particular order or arrangement among or between various operations or elements except when the order of individual operations or arrangement of elements is explicitly described.

It can be understood that one or more of the memory components 604 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 606 include a wireless wide area network component ("WWAN component") 622, a wireless local area network component ("WLAN component") 624, and a wireless personal area network component ("WPAN component") 626. The network connectivity components 606 facilitate communications to and from the network 656 or another network, which may be a WWAN, a WLAN, or a WPAN. Although only the network 656 is illustrated, the network connectivity components 606 may facilitate simultaneous communication with multiple networks, including the networks referred to in any description herein. For example, the network connectivity components 606 may facilitate simultaneous communications with multiple networks via one or more of a WWAN, a WLAN, or a WPAN.

The network 656 may be or may include a WWAN, such as a mobile telecommunications network utilizing one or more mobile telecommunications technologies to provide voice and/or data services to a computing device utilizing the computing device architecture 600 via the WWAN component 622. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 656 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 656 may be configured to provide voice and/or data communications with any combination of the above technologies. The network 656 may be configured to or adapted to provide voice and/or data communications in accordance with future generation technologies.

In some configurations, the WWAN component 622 is configured to provide dual-multi-mode connectivity to the network 656. For example, the WWAN component 622 may be configured to provide connectivity to the network 656, wherein the network 656 provides service via GSM and UMTS technologies, or via some other combination of technologies. Alternatively, multiple WWAN components 622 may be utilized to perform such functionality, and/or provide additional functionality to support other non-compatible technologies (i.e., incapable of being supported by a single WWAN component). The WWAN component 622 may facilitate similar connectivity to multiple networks (e.g., a UMTS network and an LTE network).

The network 656 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that is functioning as a WI-FI hotspot. The WLAN component 624 is configured to connect to the network 656 via the WI-FI access points. Such connections may be secured via various encryption technologies including, but not limited to, WI-FI Protected Access ("WPA"), WPA2, Wired Equivalent Privacy ("WEP"), and the like.

The network 656 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 626 is configured to facilitate communications with other devices, such as peripherals, computers, or other computing devices via the WPAN. For instance, all digital inking devices 100 disclosed herein can be in communication with a paired computer 101 via a BLUETOOTH connection, a WI-FI connection, WI-FI DIRECT connection, etc.

The sensor components 608 include a magnetometer 628, an ambient light sensor 630, a proximity sensor 632, an accelerometer 634, a gyroscope 636, and a Global Positioning System sensor ("GPS sensor") 638. It is contemplated that other sensors, such as, but not limited to, temperature sensors or shock detection sensors, also may be incorporated in the computing device architecture 600.

The magnetometer 628 is configured to measure the strength and direction of a magnetic field. In some configurations the magnetometer 628 provides measurements to a compass application program stored within one of the memory components 604 in order to provide a user with accurate directions in a frame of reference including the cardinal directions, north, south, east, and west. Similar measurements may be provided to a navigation application program that includes a compass component. Other uses of measurements obtained by the magnetometer 628 are contemplated.

The ambient light sensor 630 is configured to measure ambient light. In some configurations, the ambient light sensor 630 provides measurements to an application program stored within one the memory components 604 in order to automatically adjust the brightness of a display (described below) to compensate for low-light and high-light environments. Other uses of measurements obtained by the ambient light sensor 630 are contemplated.

The proximity sensor 632 is configured to detect the presence of an object or thing in proximity to the computing device without direct contact. In some configurations, the proximity sensor 632 detects the presence of a user's body (e.g., the user's face) and provides this information to an application program stored within one of the memory components 604 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity information as detected by the proximity sensor 632 are contemplated.

The accelerometer 634 is configured to measure proper acceleration. In some configurations, output from the accelerometer 634 is used by an application program as an input mechanism to control some functionality of the application program. For example, the application program may be a video game in which a character, a portion thereof, or an object is moved or otherwise manipulated in response to input received via the accelerometer 634. In some configurations, output from the accelerometer 634 is provided to an application program for use in switching between landscape and portrait modes, calculating coordinate acceleration, or detecting a fall. Other uses of the accelerometer 634 are contemplated.

The gyroscope 636 is configured to measure and maintain orientation. In some configurations, output from the gyroscope 636 is used by an application program as an input mechanism to control some functionality of the application program. For example, the gyroscope 636 can be used for accurate recognition of movement within a 3D environment of a video game application or some other application. In some configurations, an application program utilizes output from the gyroscope 636 and the accelerometer 634 to enhance control of some functionality of the application program. Other uses of the gyroscope 636 are contemplated.

The GPS sensor 638 is configured to receive signals from GPS satellites for use in calculating a location. The location calculated by the GPS sensor 638 may be used by any application program that requires or benefits from location information. For example, the location calculated by the GPS sensor 638 may be used with a navigation application program to provide directions from the location to a destination or directions from the destination to the location. Moreover, the GPS sensor 638 may be used to provide location information to an external location-based service, such as E911 service. The GPS sensor 638 may obtain location information generated via WI-FI, WIMAX, and/or cellular triangulation techniques utilizing one or more of the network connectivity components 606 to aid the GPS sensor 638 in obtaining a location fix. The GPS sensor 638 may also be used in Assisted GPS ("A-GPS") systems. The GPS sensor 638 can also operate in conjunction with other components, such as the processor 602, to generate positioning data for the computing device 600.

The I/O components 610 include a display 640, a touchscreen 642, a data I/O interface component ("data I/O") 644, an audio I/O interface component ("audio I/O") 646, a video I/O interface component ("video I/O") 648, and a camera 650. In some configurations, the display 640 and the touchscreen 642 are combined. In some configurations two or more of the data I/O component 644, the audio I/O component 646, and the video I/O component 648 are combined. The I/O components 610 may include discrete processors configured to support the various interfaces described below, or may include processing functionality built-in to the processor 602.

In some configurations, the computing device 600 can include feedback device 651, such as an actuator or solid-state circuit configured to physically vibrate in response to a haptic signal. The processing units can cause the generation of a haptic signal associated with a generated haptic effect to feedback device 651, which in turn outputs haptic effects such as vibrotactile haptic effects, electrostatic friction haptic effects, or deformation haptic effects.

The feedback device 651 includes a drive circuit. The feedback device 651 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, computing device 600 can include one or more feedback devices 651.

The feedback device 651 is an example of a haptic output device, where a haptic output device is a device configured to output haptic effects, such as vibrotactile haptic effects, electrostatic friction haptic effects, or deformation haptic effects, in response to a drive signal. In alternate embodiments, the feedback device 651 can be replaced by some other type of haptic output device. Further, in other alternate embodiments, computing device 600 may not include an actuator, and a separate device from the computing device 600 includes an actuator, or other haptic output device, that generates the haptic effects, and computing device 600 sends generated haptic signals to that device through a communication device.

The display 640 is an output device configured to present information in a visual form. In particular, the display 640 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 640 is a liquid crystal display ("LCD") utilizing any active or passive matrix technology and any backlighting technology (if used). In some configurations, the display 640 is an organic light emitting diode ("OLED") display. Other display types are contemplated.

The touchscreen 642, also referred to herein as a "touch-enabled screen," is an input device configured to detect the presence and location of a touch. The touchscreen 642 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology.

In some configurations, the touchscreen 642 is incorporated on top of the display 640 as a transparent layer to enable a user to use one or more touches to interact with objects or other information presented on the display 640. In other configurations, the touchscreen 642 is a touch pad incorporated on a surface of the computing device that does not include the display 640. For example, the computing device may have a touchscreen incorporated on top of the display 640 and a touch pad on a surface opposite the display 640.

In some configurations, the touchscreen 642 is a single-touch touchscreen. In other configurations, the touchscreen 642 is a multi-touch touchscreen. In some configurations, the touchscreen 642 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 642. As such, a developer may create gestures that are specific to a particular application program.

In some configurations, the touchscreen 642 supports a tap gesture in which a user taps the touchscreen 642 once on an item presented on the display 640. The tap gesture may be used for various reasons including, but not limited to, opening or launching whatever the user taps. In some configurations, the touchscreen 642 supports a double tap gesture in which a user taps the touchscreen 642 twice on an item presented on the display 640. The double tap gesture may be used for various reasons including, but not limited to, zooming in or zooming out in stages. In some configurations, the touchscreen 642 supports a tap and hold gesture in which a user taps the touchscreen 642 and maintains contact for at least a pre-defined time. The tap and hold gesture may be used for various reasons including, but not limited to, opening a context-specific menu.

In some configurations, the touchscreen 642 supports a pan gesture in which a user places a finger on the touchscreen 642 and maintains contact with the touchscreen 642 while moving the finger on the touchscreen 642. The pan gesture may be used for various reasons including, but not limited to, moving through screens, images, or menus at a controlled rate. Multiple finger pan gestures are also contemplated. In some configurations, the touchscreen 642 supports a flick gesture in which a user swipes a finger in the direction the user wants the screen to move. The flick gesture may be used for various reasons including, but not limited to, scrolling horizontally or vertically through menus or pages. In some configurations, the touchscreen 642 supports a pinch and stretch gesture in which a user makes a pinching motion with two fingers (e.g., thumb and forefinger) on the touchscreen 642 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 642. As such, the above gestures should be understood as being illustrative and should not be construed as being limiting in any way.

The data I/O interface component 644 is configured to facilitate input of data to the computing device and output of data from the computing device. In some configurations, the data I/O interface component 644 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 646 is configured to provide audio input and/or output capabilities to the computing device. In some configurations, the audio I/O interface component 646 includes a microphone configured to collect audio signals. In some configurations, the audio I/O interface component 646 includes a headphone jack configured to provide connectivity for headphones or other external speakers. In some configurations, the audio I/O interface component 646 includes a speaker for the output of audio signals. In some configurations, the audio I/O interface component 646 includes an optical audio cable out.

The video I/O interface component 648 is configured to provide video input and/or output capabilities to the computing device. In some configurations, the video I/O interface component 648 includes a video connector configured to receive video as input from another device (e.g., a video media player such as a DVD or BLURAY player) or send video as output to another device (e.g., a monitor, a television, or some other external display). In some configurations, the video I/O interface component 648 includes a High-Definition Multimedia Interface ("HDMI"), mini-HDMI, micro-HDMI, DisplayPort, or proprietary connector to input/output video content. In some configurations, the video I/O interface component 648 or portions thereof is combined with the audio I/O interface component 646 or portions thereof.

The camera 650 can be configured to capture still images and/or video. The camera 650 may utilize a charge coupled device ("CCD") or a complementary metal oxide semiconductor ("CMOS") image sensor to capture images. In some configurations, the camera 650 includes a flash to aid in taking pictures in low-light environments. Settings for the camera 650 may be implemented as hardware or software buttons.

Although not illustrated, one or more hardware buttons may also be included in the computing device architecture 600. The hardware buttons may be used for controlling some operational aspect of the computing device. The hardware buttons may be dedicated buttons or multi-use buttons. The hardware buttons may be mechanical or sensor-based.

The illustrated power components 612 include one or more batteries 652, which can be connected to a battery gauge 654. The batteries 652 may be rechargeable or disposable. Rechargeable battery types include, but are not limited to, lithium polymer, lithium ion, nickel cadmium, and nickel metal hydride. Each of the batteries 652 may be made of one or more cells.

The battery gauge 654 can be configured to measure battery parameters such as current, voltage, and temperature. In some configurations, the battery gauge 654 is configured to measure the effect of a battery's discharge rate, temperature, age and other factors to predict remaining life within a certain percentage of error. In some configurations, the battery gauge 654 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 612 may also include a power connector, which may be combined with one or more of the aforementioned I/O components 610. The power components 612 may interface with an external power system or charging equipment via an I/O component.

Example Clauses

The disclosure presented herein encompasses the subject matter set forth in the following clauses.

Clause 1. A computer implemented method, comprising: causing display, on a computing device, of a web browser including at least one selectable user interface component selectable at least to cause display of a user interface tab associated with the web browser; detecting a predetermined selection type associated with the at least one selectable user interface component; and causing display, on the computing device, of a user interface in response to detecting the predetermined selection type associated with the selectable user interface component, the user interface including at least one selectable link associated with a previously accessed webpage and/or at least one selectable link associated with a previously accessed computer application.

Clause 2. The computer implemented method according to Clause 1, wherein the predetermined selection type is a hover of a user interface pointer over the selectable user interface component for at least a predetermined duration of time, or an actuation of a control associated with an input device associated with the computing device.

Clause 3. The computer implemented method according to any of the preceding Clauses, wherein the user interface is a drop-down user interface associated with the at least one selectable user interface component, the drop-down user interface including the at least one selectable link associated with the previously accessed webpage and/or the at least one selectable link associated with the previously accessed computer application.

Clause 4. The computer implemented method according to Clause 3, wherein the drop-down user interface includes a plurality of user interface sections, a first of the plurality of user interface sections including the at least one selectable link associated with the previously accessed webpage and a second of the plurality of user interface sections including the at least one selectable link associated with the previously accessed computer application.

Clause 5. The computer implemented method according to Clause 4, wherein the first of the plurality of user interface sections and the second of the plurality of user interface sections are visually separated from one another.

Clause 6. The computer implemented method according to any of the preceding Clauses, wherein the user interface is a user interface window, the user interface window including the at least one selectable link associated with the previously accessed webpage and/or the at least one selectable link associated with the previously accessed computer application.

Clause 7. The computer implemented method according to Clause 6, wherein the user interface window comprises a plurality of user interface sections, a first of the plurality of user interface sections including the at least one selectable link associated with the previously accessed webpage and a second of the plurality of user interface sections including the at least one selectable link associated with the previously accessed computer application.

Clause 8. The computer implemented method according to any of the preceding Clauses, wherein the previously accessed webpage is a recently accessed webpage.

Clause 9. A computing device, comprising: a processor; a memory having computer-executable instructions stored thereupon which, when executed by the processor, cause the computing device to: cause display of a web browser including at least one selectable user interface component selectable at least to cause display of a user interface tab associated with the web browser; detect a predetermined selection type associated with the at least one selectable user interface component; and cause display of a user interface in response to detecting the predetermined selection type associated with the selectable user interface component, the user interface including at least one selectable link associated with a webpage and/or at least one selectable link associated with a computer application.

Clause 10. The computer implemented method according to Clause 9, wherein the predetermined selection type is a hover of a user interface pointer over the selectable user interface component for at least a predetermined duration of time, or an actuation of a control associated with an input device associated with the computing device.

Clause 11. The computer implemented method according to Clause 9, wherein the user interface is a drop-down user interface associated with the at least one selectable user interface component, the drop-down user interface including the at least one selectable link associated with the webpage and/or the at least one selectable link associated with the computer application.

Clause 12. The computer implemented method according to Clause 11, wherein the drop-down user interface includes a plurality of user interface sections, a first of the plurality of user interface sections including the at least one selectable link associated with the webpage and a second of the plurality of user interface sections including the at least one selectable link associated with the computer application.

Clause 13. The computer implemented method according to Clause 12, wherein the first of the plurality of user interface sections and the second of the plurality of user interface sections are visually separated from one another.

Clause 14. The computer implemented method according to any of the preceding Clauses, wherein the user interface is a user interface window, the user interface window including the at least one selectable link associated with the webpage and/or the at least one selectable link associated with the computer application.

Clause 15. The computer implemented method according to Clause 14, wherein the user interface window comprises a plurality of user interface sections, a first of the plurality of user interface sections including the at least one selectable link associated with the webpage and a second of the plurality of user interface sections including the at least one selectable link associated with the computer application.

Clause 16. The computer implemented method according to any of the preceding Clauses, wherein the webpage is a recently accessed webpage or a suggested webpage and/or the computer application is a recently accessed computer application or a suggested computer application.

Clause 17. A computer implemented method, comprising: causing display, on a computing device, of a web browser including a tab page button, the tab page button selectable at least to cause display of a tab page associated with the web browser, the tab page configured to display web content; detecting a predetermined selection type associated with the tab page button; causing display, on the computing device, of a user interface in response to detecting the predetermined selection type associated with the tab page button, the user interface including a visual representation for a recently accessed webpage and/or a visual representation for recently accessed computer application.

Clause 18. The computer implemented method according to Clause 17, wherein the user interface is a drop-down user interface being in close proximity to the tab page button.

Clause 19. The computer implemented method according to any of the preceding Clauses, wherein the user interface is a user interface window, the user interface window including the visual representation for the recently accessed webpage and/or the visual representation for the recently accessed computer application.

Clause 20. The computer implemented method according to any of the preceding Clauses, wherein the visual representation for the recently accessed webpage is a selectable thumbnail representation of the recently accessed webpage and/or the visual representation for the recently accessed computer application is a selectable icon representing the recently accessed computer application.

Although the techniques have been described in language specific to structural features and/or methodological acts, it is to be understood that the appended claims are not necessarily limited to the features or acts described. Rather, the features and acts are described as example implementations of such techniques.

The implementations described herein address the technical need to provide quick access to previously accessed webpages, favorite webpages, recently access webpages, previously accessed computer applications, recently accessed computer applications, favorite computer applications, and the like. To address at least this technical need, the implementations described herein provide a quickly accessible UI, such as via a UI tab button, that includes a list of previously accessed webpages, favorite webpages, recently access webpages, previously accessed computer applications, recently accessed computer applications, favorite computer applications, and the like, in selectable link format. At least one technical benefit of providing such a quickly accessible UI is that users are no longer required to select multiple UI components to obtain a list of previously accessed webpages, favorite webpages, recently access webpages, previously accessed computer applications, recently accessed computer applications, favorite computer applications, and the like. Eliminating multiple selection of UI components eliminates unnecessary processor overhead associated with a computing device. Other technical benefits not specifically identified herein can also be realized through implementations of the disclosed technologies.

It should be appreciated that the above-described subject matter may be implemented as a computer-controlled apparatus, a computer process, a computing system, or as an article of manufacture such as a computer-readable storage medium. Among many other benefits, the techniques herein improve efficiencies with respect to a wide range of computing resources. For instance, human interaction with a devices and systems may be improved as the use of the techniques disclosed herein enable users and individuals remotely manipulate rendered streams within a graphical environment associated with a communication session to better reflect their interactions in the communication session. Other technical effects other than those mentioned herein can also be realized from implementations of the technologies disclosed herein.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer implemented method, comprising:
   causing display, on a computing device, of a web browser including at least one selectable user interface component selectable at least to cause display of a user interface tab associated with the web browser;
   detecting a predetermined selection type associated with the at least one selectable user interface component, the predetermined selection type comprising a hover of a user interface pointer over the selectable user interface component for at least a predetermined duration of time;
   causing display, on the computing device, of a user interface in response to detecting the predetermined selection type associated with the selectable user interface component, the user interface including at least one selectable link associated with a previously accessed webpage;
   detecting selection of the at least one selectable link associated with the previously accessed webpage; and
   in response to detecting selection of the at least one selectable link, causing display of the previously accessed webpage in a new user interface tab associated with the web browser.

2. The computer implemented method according to claim 1, wherein the user interface is a drop-down user interface associated with the at least one selectable user interface component, the drop-down user interface including the at least one selectable link associated with the previously accessed webpage.

3. The computer implemented method according to claim 2, wherein the drop-down user interface includes a plurality of user interface sections, a first of the plurality of user interface sections including the at least one selectable link associated with the previously accessed webpage and a second of the plurality of user interface sections including the at least one selectable link associated with a previously accessed computer application.

4. The computer implemented method according to claim 3, wherein the first of the plurality of user interface sections and the second of the plurality of user interface sections are visually separated from one another.

5. The computer implemented method according to claim 1, wherein the user interface is a user interface window, the user interface window including the at least one selectable link associated with the previously accessed webpage.

6. The computer implemented method according to claim 5, wherein the user interface window comprises a plurality of user interface sections, a first of the plurality of user interface sections including the at least one selectable link associated with the previously accessed webpage and a second of the plurality of user interface sections including the at least one selectable link associated with a previously accessed computer application.

7. The computer implemented method according to claim 1, wherein the previously accessed webpage is a recently accessed webpage.

8. A computing device, comprising:
   a processor;
   a memory having computer-executable instructions stored thereupon which, when executed by the processor, cause the computing device to:
      cause display of a web browser including at least one selectable user interface component selectable at least to cause display of a user interface tab associated with the web browser;
      detect a predetermined selection type associated with the at least one selectable user interface component, the predetermined selection type comprising a hover of a user interface pointer over the selectable user interface component for at least a predetermined duration of time;
      cause display of a user interface in response to detecting the predetermined selection type associated with the selectable user interface component, the user interface including at least one selectable link associated with a webpage;
      detect selection of the at least one selectable link associated with the previously accessed webpage; and
      in response to detecting selection of the at least one selectable link, cause display of the previously accessed webpage in a new user interface tab associated with the web browser.

9. The computer implemented method according to claim 8, wherein the user interface is a drop-down user interface associated with the at least one selectable user interface component, the drop-down user interface including the at least one selectable link associated with the webpage.

10. The computer implemented method according to claim 9, wherein the drop-down user interface includes a plurality of user interface sections, a first of the plurality of user interface sections including the at least one selectable link associated with the webpage and a second of the plurality of user interface sections including the at least one selectable link associated with a computer application.

11. The computer implemented method according to claim 10, wherein the first of the plurality of user interface sections and the second of the plurality of user interface sections are visually separated from one another.

12. The computer implemented method according to claim 8, wherein the user interface is a user interface window, the user interface window including the at least one selectable link associated with the webpage.

13. The computer implemented method according to claim 12, wherein the user interface window comprises a plurality of user interface sections, a first of the plurality of user interface sections including the at least one selectable link associated with the webpage and a second of the plurality of user interface sections including the at least one selectable link associated with a computer application.

14. The computer implemented method according to claim 8, wherein the webpage is a recently accessed webpage or a suggested webpage.

15. A computer implemented method, comprising:
  causing display, on a computing device, of a web browser including a tab page button, the tab page button selectable at least to cause display of a tab page associated with the web browser, the tab page configured to display web content;
  detecting a predetermined selection type associated with the tab page button, the predetermined selection type comprising a hover of a user interface pointer over the tab page button for at least a predetermined duration of time;
  causing display, on the computing device, of a user interface in response to detecting the predetermined selection type associated with the tab page button, the user interface including a visual representation for a recently accessed webpage;
  detecting selection of the at least one selectable link associated with the recently accessed webpage; and
  in response to detecting selection of the at least one selectable link, causing display of the recently accessed webpage in a new user interface tab associated with the web browser.

16. The computer implemented method according to claim 15, wherein the user interface is a drop-down user interface being in close proximity to the tab page button.

17. The computer implemented method according to claim 15, wherein the user interface is a user interface window, the user interface window including the visual representation for the recently accessed webpage.

18. The computer implemented method according to claim 15, wherein the visual representation for the recently accessed webpage is a selectable thumbnail representation of the recently accessed webpage.

* * * * *